United States Patent
Geer (10) Patent No.: US 7,558,893 B2
(45) Date of Patent: Jul. 7, 2009

(54) LATENCY OPTIMIZED DATA ALIGNMENT RACHETING SCHEME

(75) Inventor: Charles P. Geer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 11/225,675

(22) Filed: Sep. 13, 2005

(65) Prior Publication Data

US 2006/0072619 A1    Apr. 6, 2006

(51) Int. Cl.
G06F 13/12 (2006.01)
G06F 3/00 (2006.01)

(52) U.S. Cl. .............................. 710/71; 710/29; 710/30; 710/52; 710/61

(58) Field of Classification Search ....................... None
See application file for complete search history.

(56) References Cited

U.S. PATENT DOCUMENTS 5,003,558 A * 3/1991 Gregg ........................ 375/357

OTHER PUBLICATIONS

IBM U.S. Appl. No. 10/948,777, filed Sep. 23, 2004 entitled "Byte to Byte Alignment of Multi-Path Data".

* cited by examiner

*Primary Examiner*—Alan Chen
(74) *Attorney, Agent, or Firm*—Patterson & Sheridan LLP (57) ABSTRACT

A system, method and apparatus for aligning data sequentially received on multiple single-byte data paths are provided. A sufficient number of bytes received in each channel may be stored (e.g., buffered) and examined to properly match data from each single-byte path. Once matched, the data may be output in a proper order on the multi-byte interface, for example, via some type of multiplexor arrangement. Furthermore, alignment operations may be performed in such a way so as to reduce the latencies involved in aligning data.

20 Claims, 7 Drawing Sheets

|  | FLAG | $D_0$ | $D_1$ |
|---|---|---|---|
| CYCLE 1 | 0000 | 0100 | 0000 |
|  | 0000 | 0000 | 0000 |
|  | 0000 | 0000 | 0000 |
|  | 0000 | 0000 | 0000 |
|  | 0000 | 0000 | 0000 |
|  | 0000 | 0000 | 0000 |
| CYCLE 2 | 0010 | 0000 | 0000 |
|  | 0000 | 0100 | 0000 |
|  | 0000 | 0000 | 0000 |
|  | 0000 | 0000 | 0000 |
|  | 0000 | 0000 | 0000 |
|  | 0000 | 0000 | 0000 |
| CYCLE 3 | 0000 | 0000 | 0001 |
|  | 0010 | 0000 | 0000 |
|  | 0000 | 0100 | 0000 |
|  | 0000 | 0000 | 0000 |
|  | 0000 | 0000 | 0000 |
|  | 0000 | 0000 | 0000 |
| CYCLE 4 | 0000 | 0000 | 0000 |
|  | 0000 | 0000 | 0001 |
|  | 0010 | 0000 | 0000 |
|  | 0000 | 0100 | 0000 |
|  | 0000 | 0000 | 0000 |
|  | 0000 | 0000 | 0000 |
| CYCLE 5 | 0000 | 0000 | 0000 |
|  | 0000 | 0000 | 0000 |
|  | 0000 | 0000 | 0001 |
|  | 0010 | 0000 | 0000 |
|  | 0000 | 0100 | 0000 |
|  | 0000 | 0000 | 0000 |

| FLAG | $D_0$ | $D_1$ |
|---|---|---|
| 0 0 0 0 | 0 0 0 0 | 0 0 0 [1 ←UB→ 00<br>       LB → 11 |
| 0 0 [1 0 ←UB→ 01<br>     LB →10 | 0 0 0 0 | 0 0 0 0 |
| 0 0 0 0 | 0 [1 0 0 ←UB→ 10<br>   LB → 01 | 0 0 0 0 |
| 0 0 0 0 | 0] 0 0 0 | 0 0 0 0 |

FLAG OFFSET = 0110 → 6

$D_0$ OFFSET = 1001 → 9

$D_1$ OFFSET = 0011 → 3

LATENCY OPTIMIZED DATA ALIGNMENT RACHETING SCHEME

CROSS-REFERENCE TO RELATED APPLICATIONS

This application contains subject matter which is related to the subject matter of the commonly owned, co-pending U.S. Application entitled "BYTE TO BYTE ALIGNMENT OF MULTI-PATH DATA," application Ser. No. 10/948,777, filed on Sep. 23, 2004, hereby incorporated herein by reference in its entirety.

BACKGROUND OF THE INVENTION

1. Field of the Invention

The present invention generally relates to exchanging packets of data on a bus between two devices, and more specifically to dynamically reordering data sequentially received on multiple single byte input paths to ensure bytes of data are properly aligned when presented on a multi-byte interface.

2. Description of the Related Art

A system on a chip (SOC) generally includes one or more integrated processor cores, some type of embedded memory, such as a cache shared between the processors cores, and peripheral interfaces, such as external bus interfaces, on a single chip to form a complete (or nearly complete) system. The external bus interface is often used to pass data in packets over an external bus between these systems and an external device, such as an external memory controller or graphics processing unit (GPU).

Oftentimes, the processor cores of a SOC may process data using multiple physically independent external data paths. These external data paths may be of different dimensions (e.g., a smaller byte size/bus width) than the internal bus utilized by the processor cores, with data on the multiple paths merged (or interleaved) onto the internal bus. Data transferred on these multiple paths can become out of alignment by the time they get to internal bus receivers due to different paths on a card containing the SOC and different analog clock-to-data alignment selection within the receivers.

Unfortunately, as the data transfer rate between devices increases with advancements in technology, this misalignment problem may be worsened, resulting in data carried on one path leading or lagging data on another path by one or more clock cycles. This misalignment can lead to incorrectly assembled data fed into the processor cores after the misaligned data on different paths is merged, which may have unpredictable results and possibly catastrophic effects. Therefore, the packets must be aligned. Furthermore, packet alignment may result in introducing significant latencies that limit the data transfer rate.

Accordingly, what is needed are methods and apparatus for automatically aligning bytes of data received over multiple data paths with minimum latency.

SUMMARY OF THE INVENTION

The present invention generally relates to a system, method and apparatus for aligning data received over multiple data channels.

One embodiment of the invention provides a method for aligning bits of data received serially over multiple single-bit channels of a bus interface. The method generally includes storing, in a buffer, multiple bits of data received on each channel, detecting a predetermined sequence of bits on one of the channels indicating a synchronizing event, determining a relative offset for each of the remaining channels based on a position of a synchronization bit of each channel within the buffer at or near a time the predetermined sequence of bits is detected, adjusting the relative offsets for each of the remaining channels based on a position of the last synchronization bit received, and aligning the bits of data by controlling a position, for each channel, from which bits of data are output from the buffer according to the adjusted relative offsets.

Another embodiment of the invention provides a packet aligner for use in aligning bits of data received on multiple single-bit data channels. The packet aligner generally includes a buffer for storing multiple bits of data received on each channel, and control logic configured to analyze bits of data stored in the buffer to detect a predetermined sequence on one of the channels indicating a synchronizing event, determine a relative offset for each of the remaining channels based positions of synchronization bits received for each channel within the buffer at or near a time the predetermined sequence is detected, adjust the relative offsets for each of the remaining channels based on a position of the last synchronization bit received, and align bits of data by controlling the position from which bits of data are output from the buffer according to the adjusted relative offsets.

Another embodiment of the invention provides a system generally including a bus having a plurality of serial data channels, a first processing device, a second processing device coupled with the first processing device via the bus, and a packet aligner on at least the first processing device. The packet aligner generally includes a buffer for storing multiple bits of data received on each channel and control logic configured to analyze bits of data stored in the buffer to detect a predetermined sequence of bits sent by the second processing device on one of the channels indicating a synchronizing event, determine a relative offset for each of the remaining channels based on a position of a synchronization bit received for each channel within the buffer at or near a time the predetermined sequence is detected, adjust the relative offsets for each of the remaining channels based on a position of the last synchronization bit received, and align bits of data by controlling the position from which bits of data are output from the buffer according to the adjusted relative offsets.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention may be utilized in an effort to ensure that bytes of data sequentially received on multiple single-byte data paths are properly aligned when presented on a multi-byte interface. A sufficient number of bytes received in each channel may be stored (e.g., buffered) and examined to properly match data from each single-byte path. Once matched, the data may be output in a proper order on the multi-byte interface, for example, via some type of multiplexor arrangement. For some embodiments, alignment operations may be performed in such a way so as to reduce the latencies involved in aligning data.

As used herein, the term data packet generally refers to any collection of data sent together, commonly between two devices and often with some type of header containing information about the data contained therein. While the size of a data packet may vary, it will typically (but not necessarily) be some multiple of N-bytes (e.g., 8-bytes, 16-bytes, etc., if N=8). As used herein, the term byte generally refers to some standard, fixed unit of data having a given number of bits (e.g., 8-bits, 16-bits, and the like), For convenience, but not for the purposes of limitation, the following description will refer to data packets that are multiples of 8 bytes, with each byte having 8-bits.

Further, in the following description, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

AN EXEMPLARY SYSTEM

Figure 1:
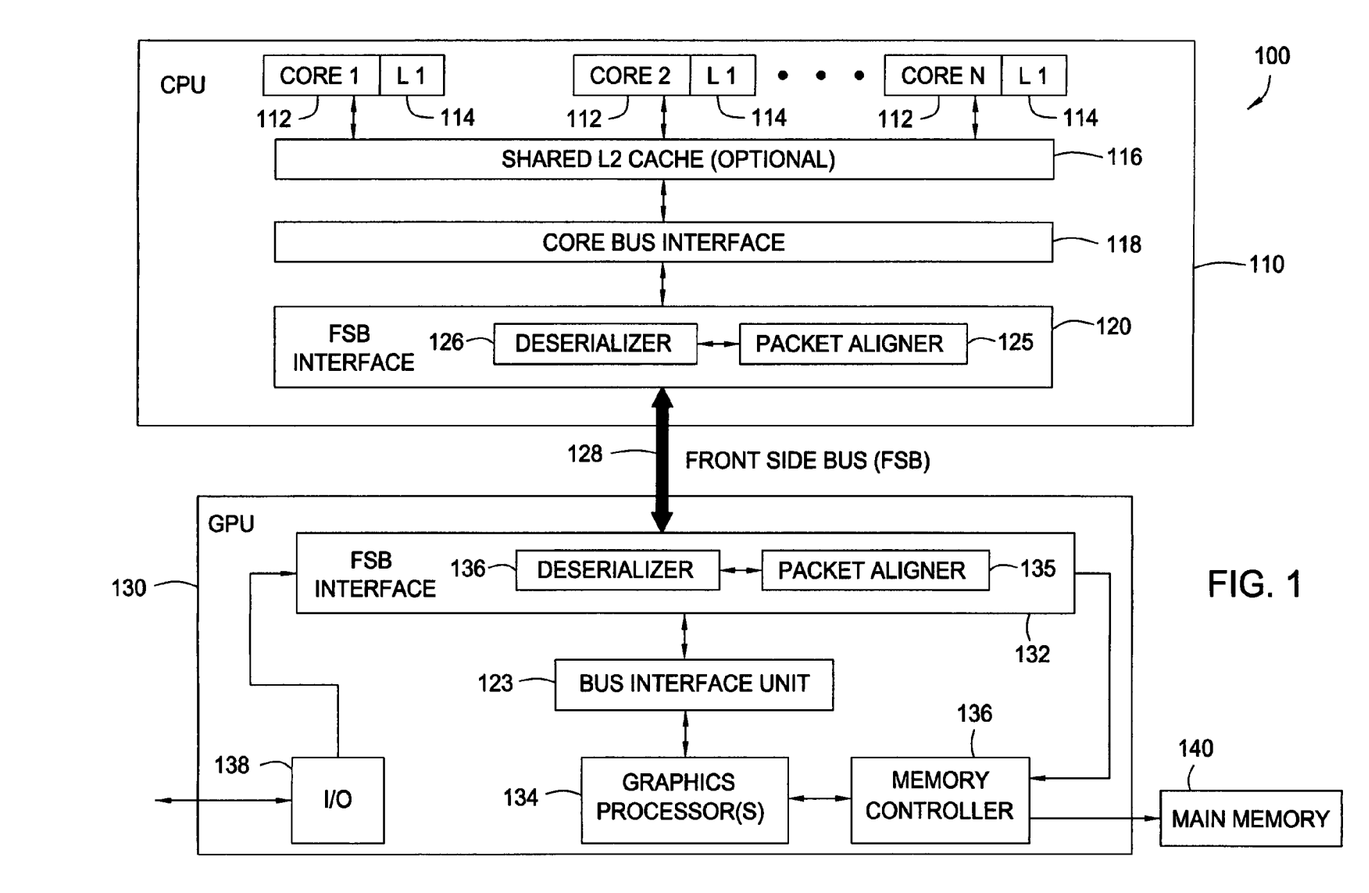
FIG. 1 is illustrates an exemplary system including a central processing unit (CPU), in which embodiments of the present invention may be utilized.

FIG. 1 illustrates an exemplary computer system 100 including a central processing unit (CPU) 110, in which embodiments of the present invention may be utilized. As illustrated, the CPU 110 may include one or more processor cores 112, which may each include any number of different types of function units including, but not limited to arithmetic logic units (ALUs), floating point units (FPUs), and single instruction multiple data (SIMD) units. Examples of CPUs utilizing multiple processor cores include the Power PC line of CPUs, available from International Business Machines (IBM).

As illustrated, each processor core 112 may have access to, its own primary (L1) cache 114, as well as a larger shared secondary (L2) cache 116. In general, copies of data utilized by the processor cores 112 may be stored locally in the L2 cache 116, preventing or reducing the number of relatively slower accesses to external main memory 140. Similarly, data utilized often by a processor core may be stored in its L1 cache 114, preventing or reducing the number of relatively slower accesses to the L2 cache 116.

The CPU 110 may communicate with external devices, such as a graphics processing unit (GPU) 130 and/or a memory controller 136 via a system or frontside bus (FSB) 128. The CPU 110 may include an FSB interface 120 to pass data between the external devices and the processing cores 112 (through the L2 cache) via the FSB 128. An FSB interface 132 on the GPU 130 may have similar components as the FSB interface 120. The FSB interface 132 may be configured to exchange data with one or more graphics processors 134, input output (I/O) unit 138, and the memory controller 136 (illustratively shown as integrated with the GPU 130), via a bus interface unit (BIU) 123.

As illustrated, the FSB interface 120 may include a Packet Aligner 125 and a Deserializer 126. For some embodiments, data may be sent over the FSB as packets. Therefore, the Deserializer 126 may contain circuitry (not shown) configured to encode into packets or "packetize" data received from the FSB and to decode packets of data received from the FSB. For some embodiments, data may be transmitted from the FSB via multiple single-byte data paths, for example, with one path used for transferring even bytes and another path for transferring odd bytes.

As previously described, bytes of data carried on the different internal paths may become skewed due to various factors, such as internal capacitance, different routing of the different internal paths, and the like. Some of these factors are generally static and contribute to a relatively static skew. However, other factors, such as thermal drift, tend to cause variance which may vary the skew over time. Further, various factors in the FSB interface 120, such as the clock timing of the interface used to pass data between buffering mechanisms may result in skew between the multiple paths that varies over time.

Byte to Byte Alignment

In order to compensate for (both static and dynamic) skew between the multiple paths, the FSB Interface 120 may include a Packet Aligner 125. Because the GPU 130 may utilize similar mechanism for data transfer, the GPU FSB interface 132 may also include a Packet Aligner 135 to compensate for skew on multiple single-byte data paths used therein.

Packet Aligners 125 and 135 may receive multiple bytes of data and align the multiple bytes according to data offsets determined by a synchronization (sync) operation. A sync operation is performed to determine the relative skew between bits of data. A flag, sent on a separate bit channel, may be used to indicate that a sync operation is being performed. In one embodiment of the invention a flag may be set to logic 1 for a single cycle along with other data to indicate a sync operation. The width of the sync operation may be determined by the maximum possible skew between data bits across the serial interface in order to capture all the skewed data bits within the bounds of the sync operation.

Sync operations may be performed to synchronize communication between devices such as a CPU and a GPU. For example, before initiating a transaction with the GPU, a CPU may initiate a synchronization operation with the GPU by first sending a sync packet. Such a sync operation may also be performed periodically or in response to a detection of errors in communication. For example, a GPU may initiate a sync operation with a CPU if the Cyclic Redundancy Check (CRC) of packets assembled at the GPU indicate transmission errors. For example, in response to detecting a predetermined threshold of CRC errors, a device may indicate it is out of synch by setting/clearing one or more status bits in a data packet sent to the other device, thereby causing the other device to transmit a sync packet to automatically adjust skew.

Figure 2A:
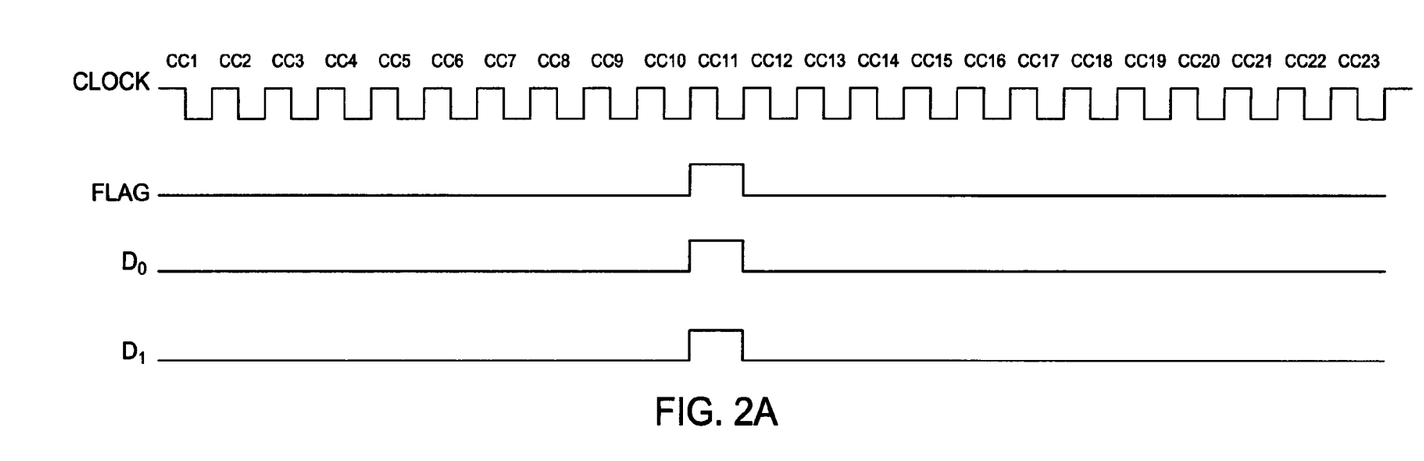
FIGS. 2A-2B are waveforms that illustrate skewing of data bits as they are transmitted over a front-side bus

FIG. 2A illustrates an example of a sync packet between a device such as the CPU to another device such as a GPU over a FSB. For purposes of simplicity, the synchronization is performed on two data bit channels D0 and D1 utilizing a flag channel. The maximum possible skew for the data bits is assumed to be 10 clock cycles. This means that in the worst case the data bits may lag the flag bit by 10 clock cycles or lead the flag bit by 10 clock cycles. Therefore, the width of the sync operation is at least 21 clock cycles long to include the flag bit and the worst case scenario where a flag bit could be lagging by 10 clock cycles or leading by 10 clock cycles. To accomplish this, the flag bit ("1") is surrounded by 10 zeros. The flag bit, along with data bits D0 and D1 are set to logic 1 in eleventh clock cycle. Therefore, a sync operation may be detected by detecting a flag bit surrounded by a number of logic 0's, the number being determined by the maximum possible skew for the data bits.

Figure 2B:
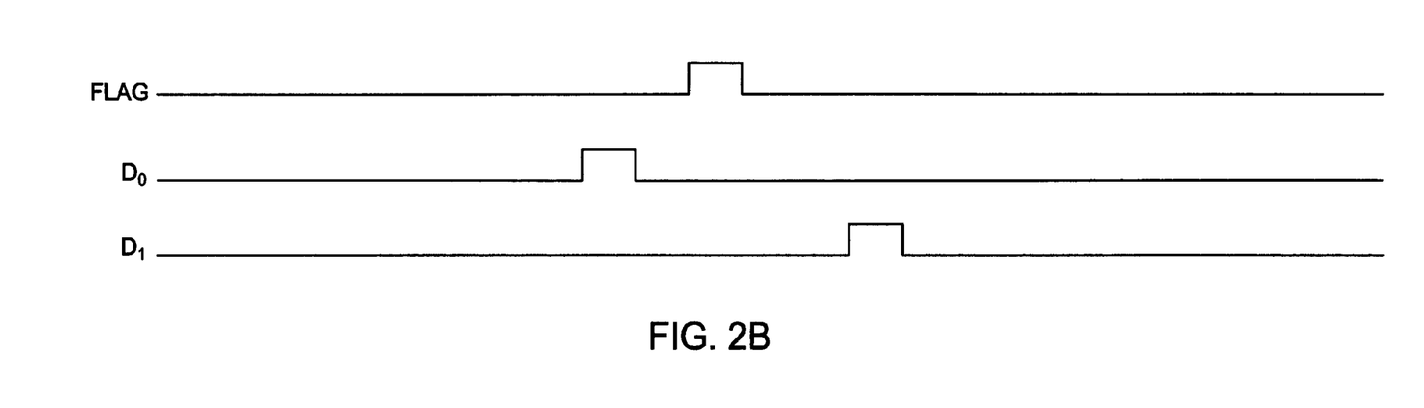

FIG. 2B illustrates an example of what the signals sent by the CPU may look like when they arrive at the GPU. In this example, data bit D0 precedes the flag bit by one clock cycle, and data bit D1 lags the flag bit by two clock cycles as a result of the skew in their respective paths. D0 and D1 must therefore be aligned before they can be passed on to another interface such as the Graphics processor to avoid possible loss in performance.

Figure 3:
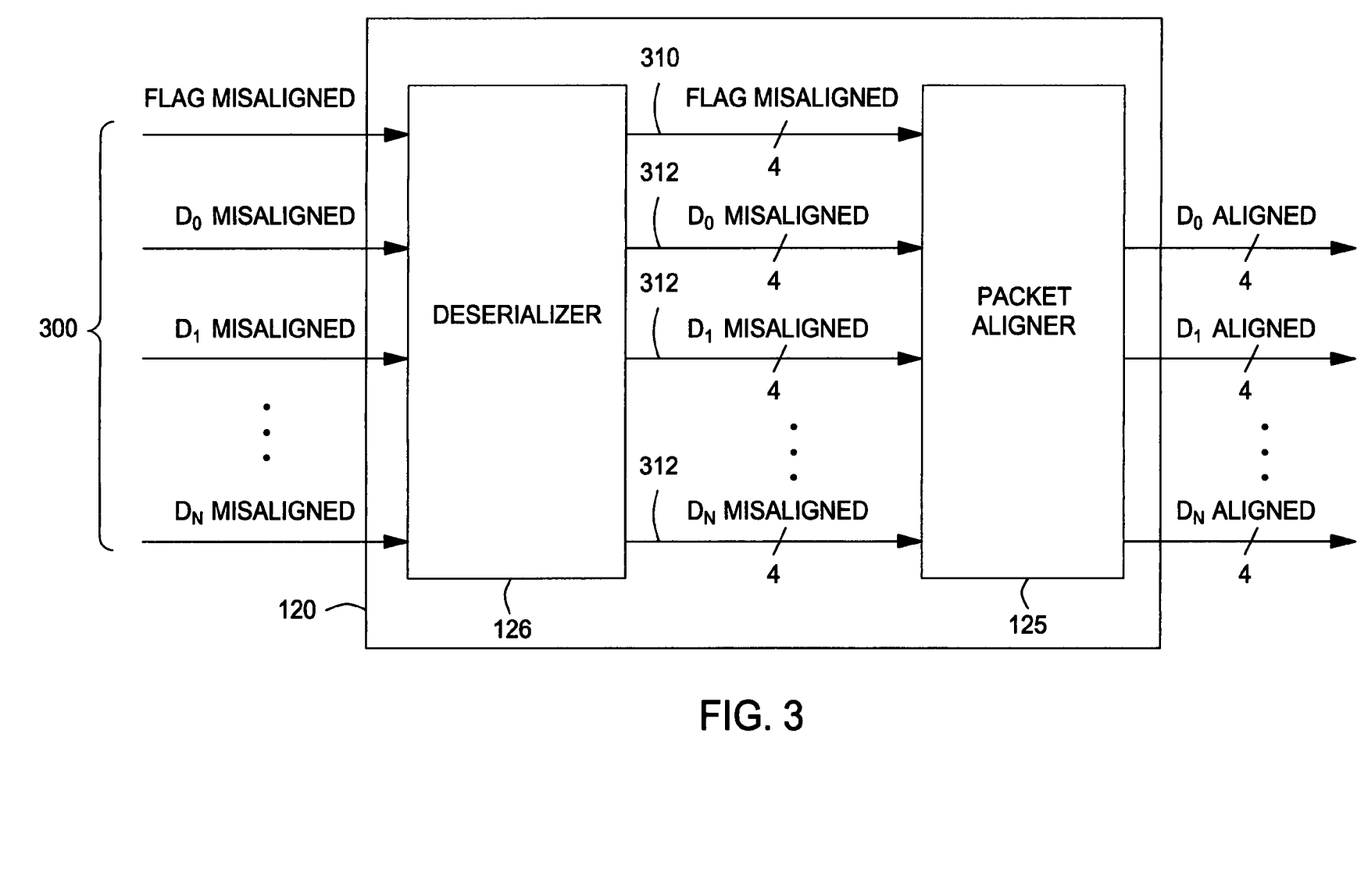
FIG. 3 is a block diagram of a Front-Side Bus Interface and its components, according to one embodiment of the invention.

FIG. 3 exemplifies a FSB Interface 120 comprising a Deserializer 126 and a Packet Aligner 125. FSB Interface 125 may contain any combination of latches, control logic circuitry and Multiplexors (Mux) to determine and correct the skew between data bits. Deserializer 126 may receive bits of data 300 sent serially over the FSB and group these bits before sending them to the Packet Aligner. For example, in FIG. 3, the Deserializer groups 4 sequential bits and passes them in parallel to the Packet Aligner 125. However, in other embodiments of the invention, any number of bits may be grouped together. The Packet Aligner receives as an input the misaligned flag and data bits 310, 312. If a flag is detected, the skew between data bits may be determined based on the bit positions. The Packet Aligner may generate signals according to the detected skew to delay data on leading paths so that the data is synchronously output on data paths D0-DN Aligned (322). In other embodiments of the invention, the bit channels may first be aligned by the Packet Aligner to provide aligned serial data to the Deserializer.

Figure 4:
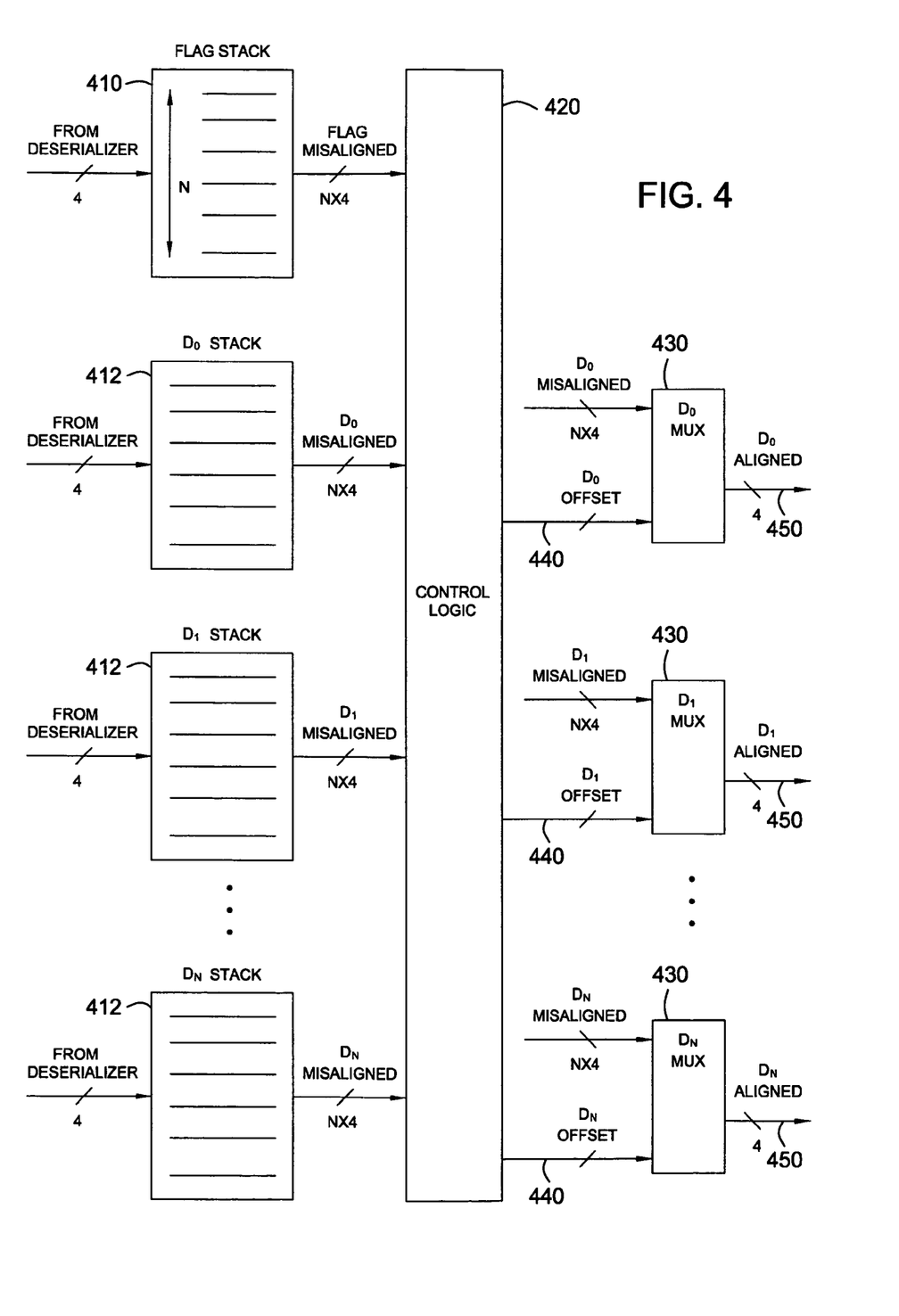
FIG. 4 is a block diagram of the Packet Aligner, according to one embodiment of the invention.

FIG. 4 illustrates an exemplary Packet Aligner 125. As illustrated, the Packet Aligner may contain a plurality of stacks comprising a Flag Stack 410 and Data Stacks 412. The Flag Stack 410 receives a group of flag bits from the Deserializer 126 which may be placed at the top of the stack. Similarly, Data Stacks 412 comprising D0 Stack—DN Stack, receive groups of data bits in parallel from the Deserializer which may be stored at the top of the respective stacks. As data is received from the Deserializer, previous stack data is pushed down by one level in the stack to accommodate the newly received data at the top of the stack. The depth of the stack may be at least as deep so as to accommodate the maximum possible skew among the data bits.

The Packet Aligner may also contain Control Logic Circuitry 420 that may monitor the Flag Stack 410. If a flag is detected, the Control Logic 420 may locate the positions data bits set to ("1") in Stacks D0-DN and calculate an offset value for each data bit based on the position of the bit in the stack. The Control Logic may also generate and send to Data Muxes 430, signals 440 representing the calculated offset values for each data bit. The offsets for each data channel may be determined by a set of upper bits and a set of lower bits. The upper bits may select the level of the stack from which to output data and the lower bits may select the location of the bit within a particular stack level. The upper and lower bits are described in greater detail in the following section. Data Muxes 430 may receive as an input the misaligned data bits D0-DN from the Deserializer. The Data Muxes may output aligned data bits D1 Aligned—DN Aligned based on the signals, received from the Control Logic.

Figure 5:
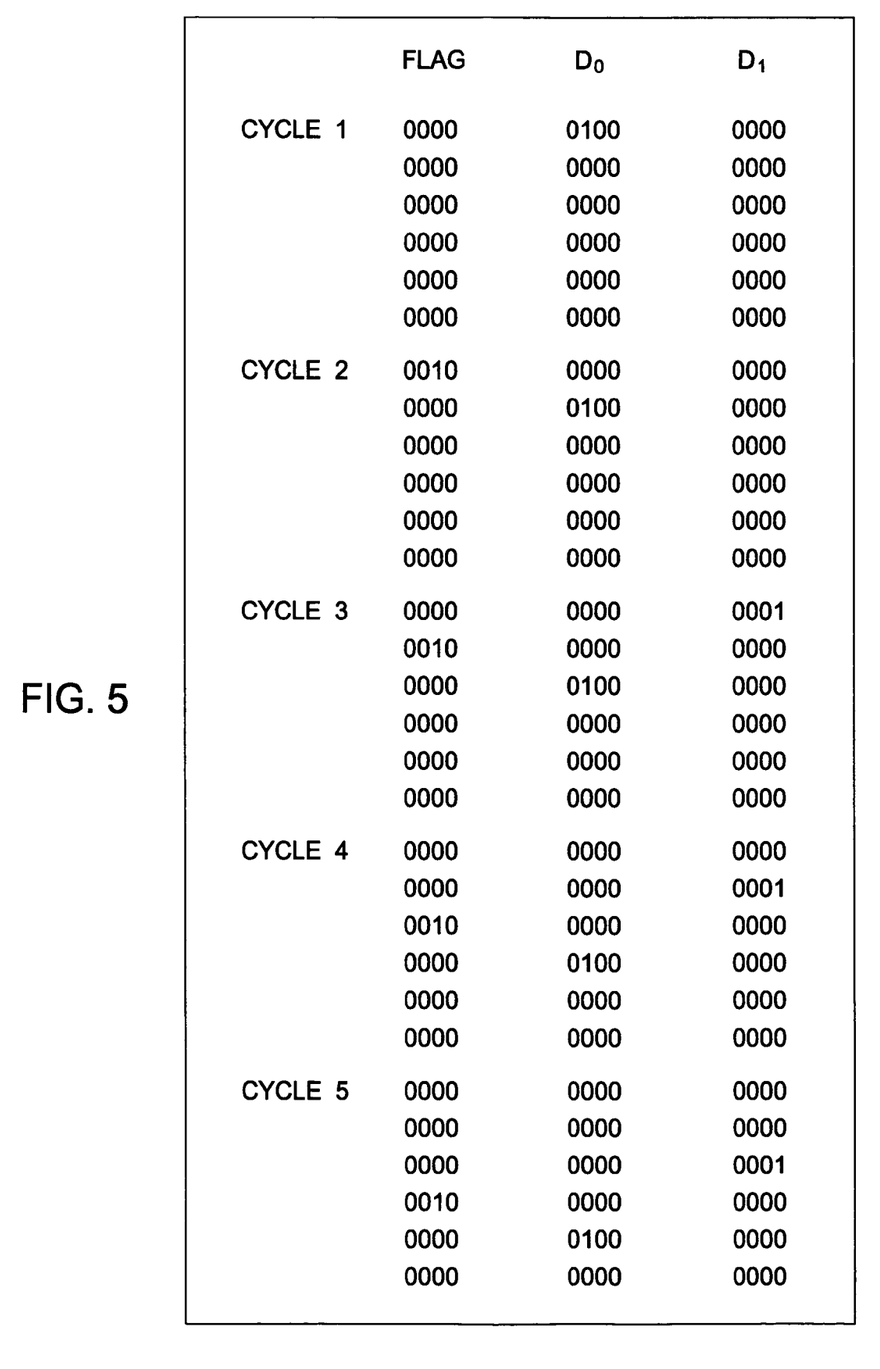
FIG. 5 illustrates the contents of the flag and data stacks in multiple cycles, according to one embodiment of the invention.

In FIG. 5, the contents of each of the Flag Stack 410 and Data Stacks 412 are shown for multiple cycles. For purposes of simplicity only the contents of Data Stacks D0 and D1 are shown. As in FIG. 3, the Deserializer groups 4 bits of serial data before sending it to the Packet Aligner, and the maximum possible skew between the data bits is assumed to be ten clock cycles. Therefore, the stacks contain four bits in each row, the top row being the most recent group of bits received from the Deserializer. Each row comprises the bits in the sequential order in which they were received, the rightmost bit being the latest arriving bit. Furthermore, each stack is deep enough to contain at least twenty one bits to capture the maximum possible skew between the data bits. In FIG. 5, for example the stacks contain at least 6 entries.

Control Logic 420 monitors the Flag Stack 410 to detect a sync operation. In the present example, a sync operation is detected if a flag bit with logic 1 is preceded and followed by ten logic 0's. Referring to FIG. 5, in cycle 1, no flag bit with logic 1 is detected. Therefore, a new group of four bits is received from the Deserializer and placed on top of the stack. In cycles 2 and 3, even though a bit with logic 1 is preceded by ten logic 0's, a sync operation cannot be determined until the logic 1 is also followed by ten logic 0's. In the present example this condition does not occur till cycle 4. When the sync operation is detected in cycle 4, the Control Logic may determine the positions of the set bits in the Data Stacks D0-DN to calculate an offset value. For example, in FIG. 5, D0 has an offset of 13 because it is thirteen positions from the last received bit at the top of the stack. The D1 offset is also similarly calculated to be 7.

Figure 6:
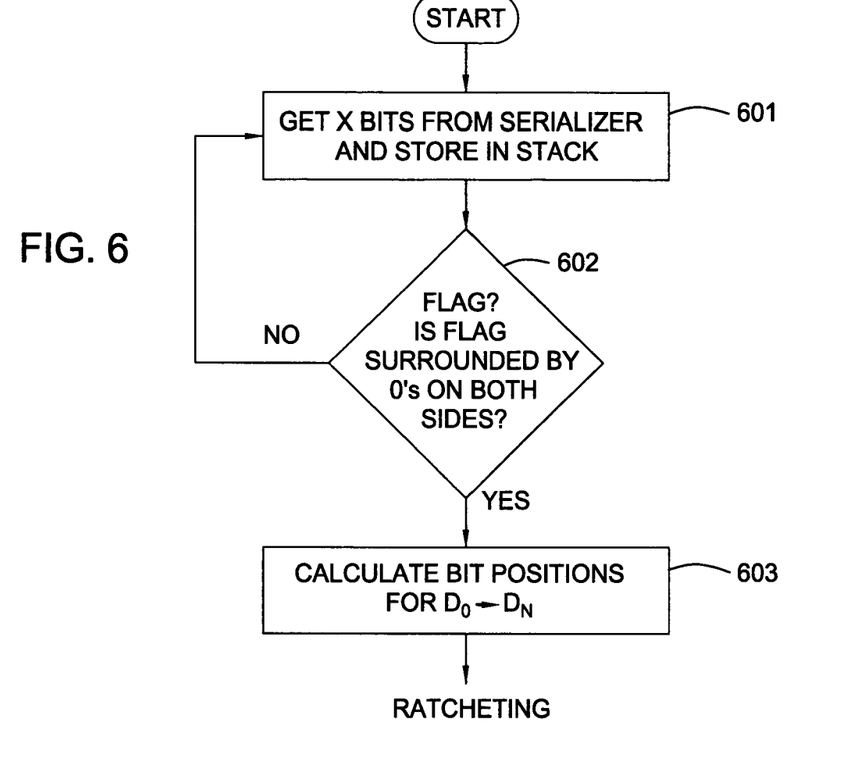
FIG. 6 is a general flow diagram of exemplary operations performed by the Control Logic to detect a flag and determine offsets for data bits, according to one embodiment of the invention.

FIG. 6 is a flow diagram of exemplary operations performed by the Control Logic 420 for flag detection and offset calculation. The operations begin at step 601, by getting a group of X bits, for each bit channel, from the Deserializer and placing them at the top of a common stack. At step 602, the stack is examined to detect a sync operation. As in previous examples such a detection may involve finding a flag bit with logic 1 that is surrounded by a certain number of logic 0's. In some embodiments of the invention such a flag detection step my involve performing OR operations at each level of the stack to detect the logic 1 bit. However, any combinations of bits set to any combination of logic 1's and logic 0's may be used to represent a flag, and an appropriate flag detection algorithm may be used accordingly. If a flag is not detected in step 602, step 601 is performed again and another group of X bits are received from the Deserializer until a flag is detected. When flag is detected in step 602, the offsets for the flag bit and the data bits D0-DN are calculated in step 603.

One advantage of the claimed invention is that it provides for an almost instantaneous alignment. This is because the present invention does not require a drawn out training sequence which may involve the exchange of multiple synchronization packets. Instead, the claimed invention aligns data almost instantaneously in response to just one synchronization packet being detected in the stack.

Ratcheting Offset Values

For some embodiments, the offsets calculated in step 603 may be optimized to reduce latency. For example, referring back to FIG. 5, the offset values for D0 and DN may be normalized to the latest arriving bit. This may be performed by subtracting from the offsets a factor of the width of the stack X. The factor may be determined by the number of levels in the stack that are above the latest arriving. For example, in Cycle 4 of FIG. 5, the width of the stack is 4 and the latest arriving bit is D1. Because there is 1 level above the logic 1 bit in the D1 stack all the offsets may be normalized by subtracting 4(4×1) from all the offsets. Such a reduction in the offset values may reduce latency by making data available at the earliest possible time. This is because data may become available before it propagates as far down as was previously required.

Figure 7:
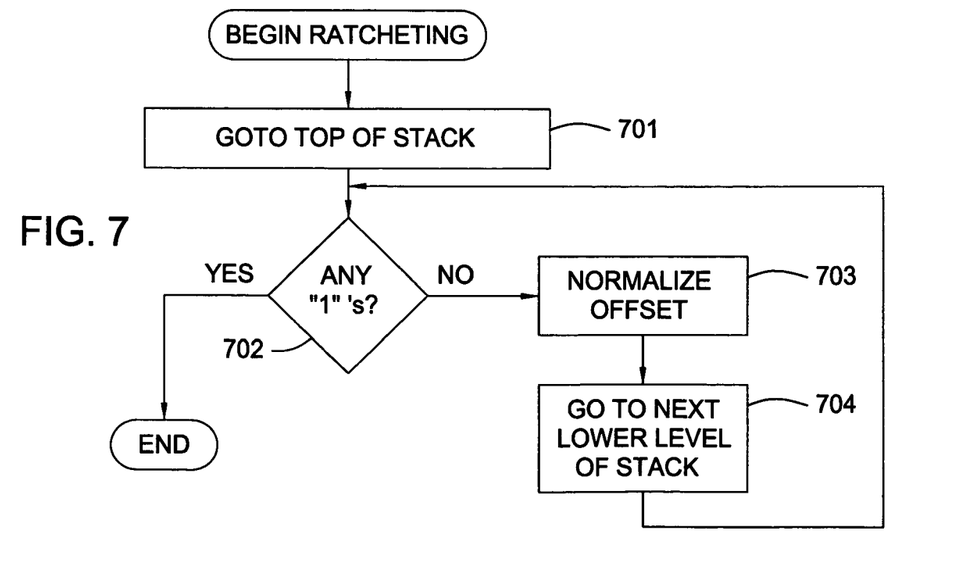
FIG. 7 is a general flow diagram of exemplary operations performed according to the ratcheting scheme, according to one embodiment of the invention.

FIG. 7 is a flow diagram of a ratcheting scheme that may be used to normalize offset values. The ratcheting scheme begins in step 701, by setting pointers to point to the top of each of the data stacks. At step 702, the top of each stack is examined to detect a logic 1 bit. In some embodiments of the invention this may be done by performing an OR operation on the bits at a selected level of the stack. If a logic 1 bit is not detected, in step 703, the offset values that were previously calculated are normalized by subtracting from them the value of the width of the stack X. The stack pointers are set to point to the next lower level in the stack in step 704, and the test of step 702 is repeated. If a logic 1 bit is detected in step 702, ratcheting ends and the offset values are set.

Figure 8A:
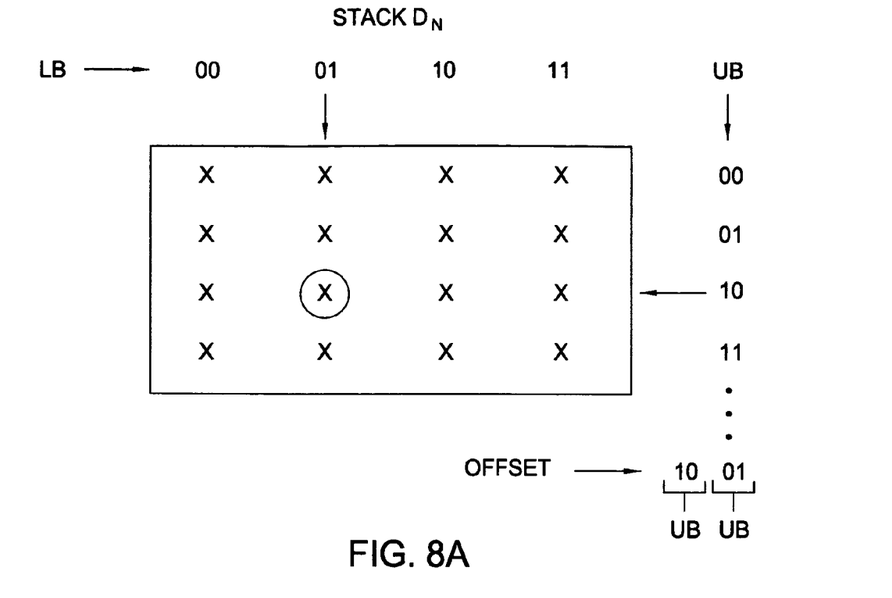
FIGS. 8A-8B illustrate the selection of locations in the stack using upper and lower offset bits to align data from different channels.

Setting the offset value may involve determining the upper and lower bits of the offset value to determine the level of the stack containing the logic 1 bit and the position of the bit within that level. For example, the upper bits (UB) may determine the level of the stack from which to choose aligned data and the lower bit (LB) may determine the location of the bit within a particular level. FIG. 8A illustrates an exemplary stack DN with a circled bit X. Because exemplary stack DN has four rows and four columns, two bits can be used to identify the row and another two bits can identify the column of circled bit X as illustrated.

Figure 8B:
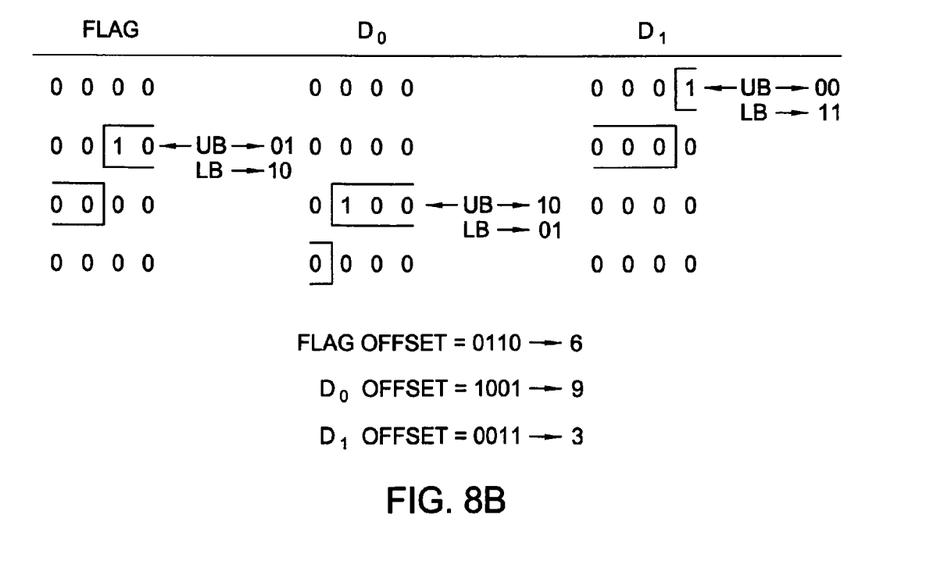

FIG. 8B illustrates Cycle 4 of FIG. 5 after the ratcheting scheme is implemented. As illustrated, the top row of each stack is ratcheted off and the upper and lower bits of each data bit are set to point to the row and the column in which the set bit ("1") is located. The boxed data bits in each of the stacks may then be presented as aligned data bits 450 (see FIG. 4) to another interface.

CONCLUSION

By automatically aligning multi-path data embodiments of the present invention may be used to compensate for various factors that may change the alignment between the multiple paths over time. Furthermore, employing a ratcheting scheme minimizes the latency introduced by the alignment. As a result, utilizing automatic alignment, as described herein, may allow for less expensive interface devices to be used, as well as more relaxed device wiring and/or layout constraints, all of which may lead to reduced costs.

While the foregoing is directed to embodiments of the present invention, other and further embodiments of the invention may be devised without departing from the basic scope thereof, and the scope thereof is determined by the claims that follow.

What is claimed is:

1. A method of aligning bits of data received serially over multiple single-bit channels of a bus interface, comprising:
   storing, in a buffer, multiple bits of data received on each channel;
   detecting a predetermined sequence of bits on one of the channels indicating a synchronizing event;
   determining a relative offset for each of the remaining channels based on a position of a synchronization bit of each channel within the buffer at or near a time the predetermined sequence of bits is detected;
   adjusting the relative offsets for each of the remaining channels based on a position of the last synchronization bit received; and
   aligning the bits of data by controlling a position, for each channel, from which bits of data are output from the buffer according to the adjusted relative offsets.

2. The method of claim 1, further comprising de-serializing multiple bits of data received over each channel by outputting N bits in parallel.

3. The method of claim 2, wherein storing multiple bits of data in the buffer comprises storing in the buffer the N bits of data output in parallel.

4. The method of claim 3, wherein:
   the buffer comprises a plurality of stacks each corresponding to one of the channels; and
   the N bits of data received over each channel are output in parallel into entries in the corresponding stacks.

5. The method of claim 4, wherein adjusting the relative offset for each of the channels comprises examining entries in each stack to identify the last synchronization bit received.

6. The method of claim 1, wherein determining the predetermined sequence of bits comprises identifying a flag bit of a first logic value surrounded by multiple bits of a second logic value.

7. A packet aligner for use in aligning bits of data received on multiple single-bit data channels, comprising:
   a buffer for storing multiple bits of data received on each channel; and
   control logic configured to analyze bits of data stored in the buffer to detect a predetermined sequence on one of the channels indicating a synchronizing event, determine a relative offset for each of the remaining channels based positions of synchronization bits received for each channel within the buffer at or near a time the predetermined sequence is detected, adjust the relative offsets for each of the remaining channels based on a position of the last synchronization bit received, and align bits of data by controlling the position from which bits of data are output from the buffer according to the adjusted relative offsets.

8. The packet aligner of claim 7, wherein the buffer is configured to receive, for each channel, N bits of data in parallel.

9. The packet aligner of claim 8, wherein the buffer is configured to receive, for each channel, the N bits of data from a de-serializer configured to de-serialize multiple bits of data received serially over each channel.

10. The packet aligner of claim 8, wherein:
the buffer comprises a plurality of stacks each corresponding to one of the channels; and
the N bits of data received over each channel are output in parallel into entries in the corresponding stacks.

11. The packet aligner of claim 10, wherein the control logic is configured to adjust the relative offset for each of the channels by examining entries in the stack to identify the last synchronization bit.

12. The packet aligner of claim 7, wherein the control logic is configured to determine the predetermined sequence of bits by identifying a flag bit of a first logic value surrounded by multiple bits of a second logic value.

13. A system, comprising:
a bus having a plurality of serial data channels;
a first processing device;
a second processing device coupled with the first processing device via the bus; and
a packet aligner on at least the first processing device, the packet aligner having a buffer for storing multiple bits of data received on each channel and control logic configured to analyze bits of data stored in the buffer to detect a predetermined sequence of bits sent by the second processing device on one of the channels indicating a synchronizing event, determine a relative offset for each of the remaining channels based on a position of a synchronization bit received for each channel within the buffer at or near a time the predetermined sequence is detected, adjust the relative offsets for each of the remaining channels based on a position of the last synchronization bit received, and align bits of data by controlling the position from which bits of data are output from the buffer according to the adjusted relative offsets.

14. The system of claim 13, wherein the buffer is configured to receive, for each channel, N bits of data in parallel.

15. The system of claim 14, wherein the buffer is configured to receive, for each channel, the N bits of data from a de-serializer configured to de-serialize multiple bits of data received serially over each channel.

16. The system of claim 14, wherein:
the buffer comprises a plurality of stacks each corresponding to one of the channels; and
the N bits of data received over each channel are output in parallel into entries in the corresponding stacks.

17. The system of claim 16, wherein the control logic is configured to adjust the relative offset for each of the channels by examining entries in the stack to identify the last synchronization bit.

18. The system of claim 13, wherein:
the predetermined sequence of bits is sent by the second processing device in response to the first processing device indicating to the second processing device that the first processing device is out of synchronization; and
the first processing device indicates the first processing device is out of synchronization via one or more bits in a packet sent to the second processing device.

19. The system of claim 13, wherein the second processing device periodically transmits the predetermined sequence of bits as part of a synchronization packet sent to the first processing device to automatically adjust the relative offsets.

20. The system of claim 13, wherein the first processing device is a central processing unit (CPU) and the second processing device is the graphics processing unit (GPU).

* * * * *